United States Patent
Hirado (10) Patent No.: US 12,456,288 B2
(45) Date of Patent: Oct. 28, 2025

(54) INFORMATION PROCESSING APPARATUS, INFORMATION PROCESSING METHOD, AND NON-TRANSITORY COMPUTER-READABLE STORAGE MEDIUM

(71) Applicant: CANON KABUSHIKI KAISHA, Tokyo (JP)

(72) Inventor: Yasuharu Hirado, Tokyo (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 464 days.

(21) Appl. No.: 18/165,358

(22) Filed: Feb. 7, 2023

(65) Prior Publication Data

US 2023/0260264 A1 Aug. 17, 2023

(30) Foreign Application Priority Data

Feb. 14, 2022 (JP) .................................. 2022-020797

(51) Int. Cl.
  *G06V 10/778* (2022.01)
  *G06F 18/214* (2023.01)
  (Continued)

(52) U.S. Cl.
  CPC .......... *G06V 10/778* (2022.01); *G06F 18/214* (2023.01); *G06N 3/08* (2013.01);
  (Continued)

(58) Field of Classification Search
  CPC .... G06V 10/778; G06V 10/82; G06V 10/454; G06F 18/214; G06F 18/24; G06N 3/08;
  (Continued)

(56) References Cited

U.S. PATENT DOCUMENTS 10,289,962 B2 5/2019 Vinyals
10,891,543 B2 * 1/2021 Hosokawa ............. G06N 3/088
(Continued)

FOREIGN PATENT DOCUMENTS

CN 111709409 A * 9/2020 ........... G06F 18/214
CN 112560978 A * 3/2021 ............. G06F 18/22
CN 113761259 A * 12/2021 ............. G06F 18/22

OTHER PUBLICATIONS

Romero, A., Ballas, N., Kahou, S.E., Chassang, A., Gatta, C., & Bengio, Y. FitNets: Hints for Thin Deep Nets. CoRR, abs/1412.6550. (Year: 2015).*

(Continued)

*Primary Examiner* — Ross Varndell
(74) *Attorney, Agent, or Firm* — Carter, DeLuca & Farrell LLP (57) ABSTRACT

An apparatus calculates a difference between a first vector extracted by a first unit and a second vector extracted by a second unit with a smaller amount of calculation than the first unit, generates a changed difference by changing a value of an element in the difference, and updates a parameter of the second unit based on the changed difference. An amount of change from a value of an element of the difference corresponding to a first element exceeding a threshold value in the first vector to a value of an element of the changed difference corresponding to the first element is larger than an amount of change from a value of an element of the difference corresponding to a second element not exceeding the threshold value in the first vector to a value of an element of the changed difference corresponding to the second element.

12 Claims, 6 Drawing Sheets

(51) Int. Cl.

| | |
|---|---|
| *G06F 18/24* | (2023.01) |
| *G06N 3/045* | (2023.01) |
| *G06N 3/08* | (2023.01) |
| *G06N 3/084* | (2023.01) |
| *G06N 3/088* | (2023.01) |
| *G06N 20/00* | (2019.01) |
| *G06V 10/82* | (2022.01) |

(52) U.S. Cl.
CPC ............. *G06N 3/084* (2013.01); *G06N 3/088* (2013.01); *G06N 20/00* (2019.01); *G06V 10/82* (2022.01); *G06F 18/24* (2023.01); *G06N 3/045* (2023.01)

(58) Field of Classification Search
CPC ........ G06N 3/084; G06N 3/088; G06N 20/00; G06N 3/045
See application file for complete search history.

(56) References Cited

U.S. PATENT DOCUMENTS

| | | | |
|---|---|---|---|
| 2019/0155924 A1* | 5/2019 | Guggilla | G06F 16/335 |
| 2021/0224604 A1* | 7/2021 | Yoo | G06V 10/82 |
| 2022/0261593 A1* | 8/2022 | Yu | G06N 3/088 |
| 2022/0398459 A1* | 12/2022 | Hsu | G06N 3/045 |

OTHER PUBLICATIONS

Romero, A. et al., "Fitnets: Hints for Thin Deep Nets" arXiv: 1412.6550v4 (Mar. 2015) pp. 1-13.

* cited by examiner

INFORMATION PROCESSING APPARATUS, INFORMATION PROCESSING METHOD, AND NON-TRANSITORY COMPUTER-READABLE STORAGE MEDIUM

BACKGROUND OF THE INVENTION

Field of the Invention

The present invention relates to a learning technology.

Description of the Related Art

In recent years, there have been proposed a large number of feature extraction technologies for extracting useful information by performing sophisticated processing of images of objects captured in a captured image. Above all, intensive studies are underway on feature extraction technologies that extract feature vectors of objects appearing in an image using a multilayer neural network called a deep net (also referred to as deep neural net or deep learning).

While it is well known that feature extraction technologies using deep net are thriving, a deep net learning method called distillation such as that disclosed in U.S. Pat. No. 10,289,962 has been further drawing attention in recent years. Distillation is a method of using a learned deep net model (called a teacher model) to perform learning of a deep net (called a student model) having a different network architecture. Generally, since learning using distillation is often performed for the purpose of slimming down the teacher model, a more simplified network architecture than the teacher model is often prepared as the student model. In distillation, the student model is learned by using feature vectors output by the teacher model in place of correct-answer labels. Therefore, learning using distillation does not require a large number of labeled learning images required for normal learning. It is known that such a distillation technology allows for propagating knowledge of the teacher model to the student model.

The student model learned by the distillation technology is enabled to output substantially equivalent feature vectors as those by the teacher model. Therefore, although the network architecture and parameters and the like attached to the network architecture are different between the student model and the teacher model, when a same image is input to both models, substantially identical feature vectors are output from both models.

In addition, research and development are actively performed, for example, "FITNETS: HINTS FOR THIN DEEP NETS" by Adriana Romero, Nicolas Ballas, Samira Ebrahimi Kahou, Antoine Chassang, Carlo Gatta & Yoshua Bengio discloses a technology for improving the ease of learning using distillation by conducting learning such that an intermediate feature vector generated in the process of calculating a feature vector by a teacher model and an intermediate feature vector generated in the process of calculating a feature vector by a student model are substantially identical to each other.

However, when distillation with a higher degree of difficulty is used, such as for example distillation in a student model in which the number of parameters for neural network (number of layers, number of neurons, etc.) are significantly reduced from the teacher model, the feature vector of the student model and the feature vector of the teacher model may not be substantially identical by using conventional methods.

SUMMARY OF THE INVENTION

The present invention provides a learning technology for causing a feature vector output from a calculation unit operating as a student model and a feature vector output from a calculation unit operating as a teacher model to be substantially identical, even when using distillation with a high degree of difficulty.

According to the first aspect of the present invention, there is provided an information processing apparatus comprising: an acquisition unit configured to calculate a first difference vector between a first feature vector extracted by a first calculation unit based on input data, and a second feature vector extracted by a second calculation unit based on the input data with a smaller amount of calculation than the first calculation unit; and an updating unit configured to generate a first changed difference vector by changing a value of an element in the first difference vector, and update a parameter of the second calculation unit based on the first changed difference vector, wherein an amount of change from a value of an element of the first difference vector corresponding to a first element exceeding a threshold value in the first feature vector to a value of an element of the first changed difference vector corresponding to the first element is larger than an amount of change from a value of an element of the first difference vector corresponding to a second element not exceeding the threshold value in the first feature vector to a value of an element of the first changed difference vector corresponding to the second element.

According to the second aspect of the present invention, there is provided an information processing method performed by an information processing apparatus, comprising: calculating a first difference vector between a first feature vector extracted by a first calculation unit based on input data, and a second feature vector extracted by a second calculation unit based on the input data with a smaller amount of calculation than the first calculation unit; and generating a first changed difference vector by changing a value of an element in the first difference vector, and updating a parameter of the second calculation unit based on the first changed difference vector, wherein an amount of change from a value of an element of the first difference vector corresponding to a first element exceeding a threshold value in the first feature vector to a value of an element of the first changed difference vector corresponding to the first element is larger than an amount of change from a value of an element of the first difference vector corresponding to a second element not exceeding the threshold value in the first feature vector to a value of an element of the first changed difference vector corresponding to the second element.

According to the third aspect of the present invention, there is provided a non-transitory computer-readable storage medium storing a computer program that causes a computer to function as: an acquisition unit configured to calculate a first difference vector between a first feature vector extracted by a first calculation unit based on input data, and a second feature vector extracted by a second calculation unit based on the input data with a smaller amount of calculation than the first calculation unit; and an updating unit configured to generate a first changed difference vector by changing a value of an element in the first difference vector, and update a parameter of the second calculation unit based on the first changed difference vector, wherein an amount of change from a value of an element of the first difference vector corresponding to a first element exceeding a threshold value in the first feature vector to a value of an element of the first changed difference vector corresponding to the first element is larger than an amount of change from a value of an element of the first difference vector corresponding to a second element not exceeding the threshold value in the first feature vector to a value of an element of the first changed difference vector corresponding to the second element.

Further features of the present invention will become apparent from the following description of exemplary embodiments with reference to the attached drawings.

DESCRIPTION OF THE EMBODIMENTS

Hereinafter, embodiments will be described in detail with reference to the attached drawings. Note, the following embodiments are not intended to limit the scope of the claimed invention. Multiple features are described in the embodiments, but limitation is not made to an invention that requires all such features, and multiple such features may be combined as appropriate. Furthermore, in the attached drawings, the same reference numerals are given to the same or similar configurations, and redundant description thereof is omitted.

First Embodiment

In the present embodiment, there will be described an example of an information processing apparatus configured to calculate a first difference vector between a first feature vector extracted by a first calculation unit based on input data, and a second feature vector extracted by a second calculation unit based on the input data with a smaller amount of calculation than the first calculation unit, generate a first changed difference vector by changing a value of an element in the first difference vector, and update a parameter of the second calculation unit based on the first changed difference vector. Here, an amount of change from a value of an element of the first difference vector corresponding to a first element exceeding a threshold value in the first feature vector to a value of an element of the first changed difference vector corresponding to the first element is larger than an amount of change from a value of an element of the first difference vector corresponding to a second element not exceeding the threshold value in the first feature vector to a value of an element of the first changed difference vector corresponding to the second element.

Figure 1:
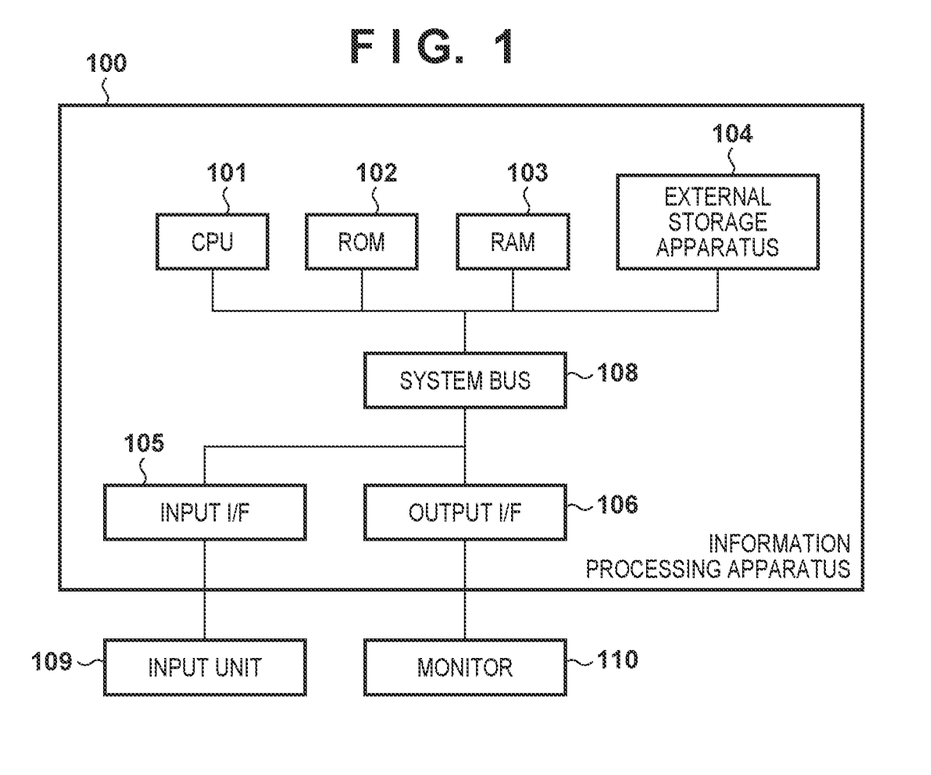
FIG. 1 is a block diagram illustrating an exemplary hardware configuration of an information processing apparatus 100.

First, an exemplary hardware configuration of an information processing apparatus 100 according to the present embodiment will be described, referring to the block diagram illustrated in FIG. 1. A CPU 101 executes various processing using a computer program and data stored in a RAM 103 or a ROM 102. Accordingly, the CPU 101 controls operation of the entire information processing apparatus 100, and also executes or controls various processing described to be performed by the information processing apparatus 100.

In the ROM 102, setting data of the information processing apparatus 100, a computer program and data relating to activation of the information processing apparatus 100, a computer program and data relating to the basic operation of the information processing apparatus 100, or the like are stored.

The RAM 103 includes an area for storing a computer program and data loaded from the ROM 102 or an external storage apparatus 104, and a work area to be used when the CPU 101 executes various processing. As such, the RAM 103 can provide various areas as appropriate.

The external storage apparatus 104 is a large-capacity information storage apparatus such as a hard disk drive apparatus. In the external storage apparatus 104, an operating system (OS), a computer program and data for causing the CPU 101 to execute or control various processing described to be performed by the information processing apparatus 100, or the like are stored. The computer program and data stored in the external storage apparatus 104 are loaded to the RAM 103 as appropriate according to the control by the CPU 101, which are then subjected to processing by the CPU 101.

Note that the external storage apparatus 104 may include an optical disk such as a flexible disk (FD) or a compact disc (CD), a magnetic or optical card, an IC card, a memory card or the like that is attachable and detachable to and from the information processing apparatus 100.

The CPU 101, the ROM 102, the RAM 103 and the external storage apparatus 104 are each connected to a system bus 108. In addition, an input I/F 105 and an output I/F 106 are further connected to the system bus 108.

An input unit 109 is connected to the input I/F 105. The input unit 109, which is a user interface such as a keyboard, a mouse, or a touch panel screen, can be operated by a user to input various instructions to the CPU 101.

A monitor 110 is connected to the output I/F 106. A monitor 110, which includes a liquid crystal screen or a touch panel screen, can display a result of processing by the CPU 101 in images, characters, or the like. Note that the monitor 110 may be a projecting apparatus such as a projector configured to project images or characters.

A computer apparatus such as a Personal Computer (PC), a Work Station (WS), a smartphone and a tablet terminal apparatus may be applied to such the information processing apparatus 100 described above. Note that a hardware configuration applicable to the information processing apparatus 100 is not limited to the configuration illustrated in FIG. 1, and may be varied/modified as appropriate.

Figure 2:
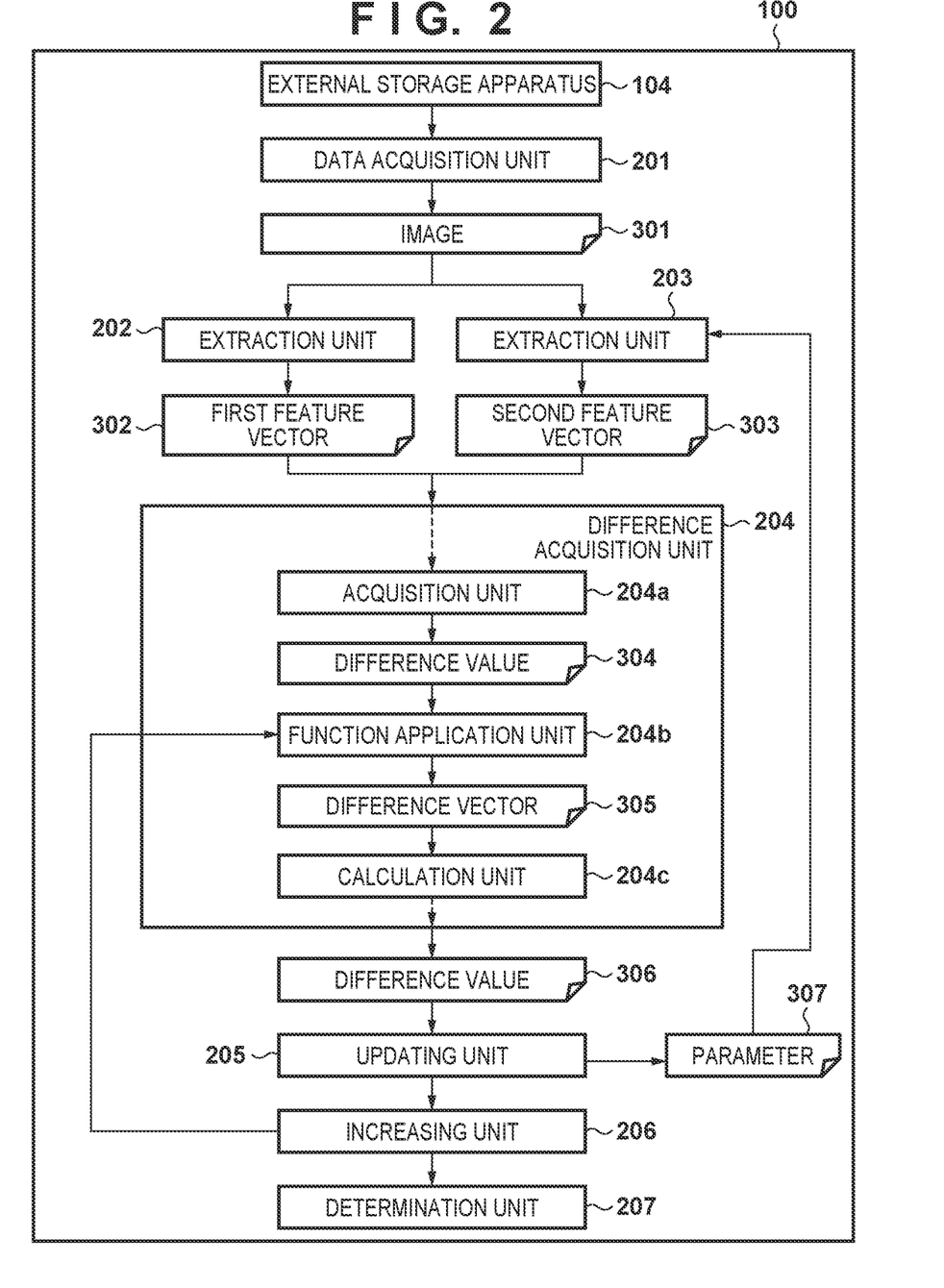
FIG. 2 is a block diagram illustrating an exemplary functional configuration of the information processing apparatus 100.

Next, an exemplary functional configuration of the information processing apparatus 100 will be described, referring to the block diagram illustrated in FIG. 2. Although the functional units of FIG. 2 may be explained below as main units of processing, the functions of the functional units are actually realized by the CPU 101 executing a computer program that causes the CPU 101 to execute or control the functions of the functional unit. Such a computer program is stored in the external storage apparatus 104, and is loaded to the RAM 103 according to the control by the CPU 101 as appropriate, and executed by the CPU 101. Note that one or more of the functional units illustrated in FIG. 2 may be implemented by hardware.

A data acquisition unit 201 loads (acquires) an image 301 stored in the external storage apparatus 104 to the RAM 103. Note that the image 301 is an example of input data, and text data, audio data, or the like may also be used as input data.

The extraction unit 202 inputs the image 301 to a deep net such as a Convolutional Neural Network (CNN) which is a teacher model, and acquires, at an intermediate layer of the deep net, a first feature vector 302 extracted from the image 301. It is assumed in the present embodiment that the first feature vector 302 is a 512-dimensional vector. The 512-dimensional first feature vector 302 is assumed to be used by an image classification system or a face recognition system, for example.

The parameters of the deep net (such as weight coefficient) to be used by the extraction unit 202 are those already acquired by learning, and are not changed in the process of learning according to the present embodiment described below.

Note that the deep net is an example of a hierarchical neural network, and the extraction unit 202 according to the present embodiment may acquire the first feature vector 302 from the image 301 using another type of hierarchical neural network.

The extraction unit 203 inputs the image 301 to a deep net (referred to as a deep net B) that requires a smaller calculation amount than the deep net (referred to as a deep net A) used by the extraction unit 202, and acquires a (512-dimensional) second feature vector 303 extracted from the image 301 at an intermediate layer of the deep net B.

The deep net B, which is a student model, has a smaller number of parameters than the deep net A (e.g., a deep net with a smaller number of intermediate layers than the deep net A, or a deep net with a smaller number of neurons than the deep net A), for example.

Although the activation function in the deep net used by the extraction unit 202 or the deep net used by the extraction unit 203 is assumed to be an Rectified Linear Unit (ReLU) in the present embodiment, the activation function is not limited thereto in the following description. In addition, it is assumed that a 1024-dimensional vector corresponding to the image 301 is output from the output layer of the deep net used by the extraction unit 202 or the deep net used by the extraction unit 203.

A difference acquisition unit 204 calculates a difference value 306 based on a difference vector between the first feature vector 302 acquired by the extraction unit 202 and the second feature vector 303 acquired by the extraction unit 203.

An acquisition unit 204a generates a difference vector 304 between the first feature vector 302 acquired by the extraction unit 202 and the second feature vector 303 acquired by the extraction unit 203. For example, the acquisition unit 204a calculates $(A_i - B_i)^2$ as the value of the i-th element $C_i$ of the difference vector 304, where $A_i$ is the i-th ($1 \leq i \leq 512$) element of the first feature vector 302 and $B_i$ is the i-th element of the second feature vector 303. In the present embodiment, the value of the element Z may also be referred to as Z. Note that instead of calculating a non-negative difference between $A_i$ and $B_i$ as the i-th element $C_i$ of the difference vector 304, the i-th element $C_i$ of the difference vector 304 may be calculated using another method.

A function application unit 204b identifies an element $A_j$ ($1 \leq j \leq 512$), among the elements of the first feature vector 302, having a value exceeding the threshold value TH1, and generates a difference vector 305 by increasing the value of the element $C_j$ of the difference vector 304 corresponding to the element $A_j$. In the following, a set of elements $C_j$ in the difference vector 304 is referred to as a "function application region". In the present embodiment, the threshold value TH1 is set to 0.

When $D_j$ is the j-th element of the difference vector 305, for example, the function application unit 204b calculates $D_j$ by applying the function f, indicated by the following Formula 1, to the element $C_j$ of the difference vector 304.

$$D_j = f(C_j) = \alpha \times C_j \qquad \text{(Formula 1)}$$

Here, $\alpha$ is a weight value having a real value equal to or larger than 1, and the function f is a function for calculating $D_j$ by increasing the value of the element $C_j$ according to the weight value $\alpha$. Note that the function applied to the element $C_j$ by the function application unit 204b is not limited to the function f indicated in (Formula 1), and another linear function may be used or nonlinear function may be used provided that the function calculates $D_j$ by increasing the value of the element $C_j$. In addition, the present invention is not limited to using a function provided that a similar purpose can be achieved.

In other words, as for a method of generating the difference vector 305, any method may be applied provided that it satisfies the condition that "the amount of change from the value of an element of the difference vector 304 corresponding to a first element of a first feature vector 302 that exceeds a threshold value TH1 to the value of an element of the difference vector 305 corresponding to the first element is larger than the amount of change from the value of an element of the difference vector 304 corresponding to a second element of the first feature vector 302 that does not exceed the threshold value TH1 to the value of an element of the difference vector 305 corresponding to the second element".

For example, the function application unit 204b may identify an element $A'_k$ ($1 \leq k \leq 512$) having a value that does not exceed the threshold value TH1 among the elements of the first feature vector 302, and generate the difference vector 305 by reducing the value of the element $C'_k$ of the difference vector 304 corresponding to the element $A'_k$. For example, the function application unit 204b calculates a k-th element $D_k$ of the difference vector 305 by applying a function f', indicated by the following (Formula 1-1), to the element $C'_k$ of the difference vector 304.

$$D_k = f'(C'_k) = \beta \times C'_k \qquad \text{(Formula 1-1)}$$

Here, $\beta$ is a weight value having a real value satisfying $0 < \beta < 1$. In this case, the function application unit 204b may or may not further apply (Formula 1). The following table indicates examples of the first feature vector 302, the second feature vector 303, the difference vector 304, and the difference vector 305.

|  | at first dimension | at second dimension | at third dimension | ... | at 510th dimension | at 511th dimension | at 512th dimension |
| --- | --- | --- | --- | --- | --- | --- | --- |
| first feature vector 302 | 0 | 255 | 123 | ... | 50 | 0 | 0 |
| second feature vector 303 | 10 | 30 | 0 | ... | 0 | 25 | 230 |
| difference vector 304 | 100 | 50,625 | 15,129 | ... | 2,500 | 625 | 52,900 |
| difference vector 305 ($\alpha = 64$) | 100 | 3,240,000 | 968,256 | ... | 160,000 | 625 | 52,900 |

Here, the weight value is set such as $\alpha=64$. For example, among the elements of the first feature vector 302 listed in the table (the first element (element at the first dimension) to the 512th element (element at the 512th dimension)), elements having a value exceeding the threshold value TH1=0 are an element at the second dimension, an element at the third dimension, and an element at the 510th dimension. Therefore, elements belonging to the function application region are an element at the second dimension, an element at the third dimension, and an element at the 510th dimension, among the elements of the difference vector 304, and the difference vector 305 is a vector calculated by multiplying the values of these elements by the weight value $\alpha=64$.

The calculation unit 204c calculates the difference value 306 by dividing a total value of the values of all the elements of the difference vector 305 by the number of dimensions 1024 of the feature vector output from the output layer of the aforementioned deep net. Note that the method for calculating the difference value 306 from the values of the elements of the difference vector 305 is not limited to a specific method. For example, the calculation unit 204c may calculate a total value of values of all the elements of the difference vector 305 as the difference value 306, or may calculate, as the difference value 306, a total value of values of elements of the difference vector 305 that are equal to or larger than a threshold value, or a value calculated by dividing the total value by 1024.

An updating unit 205 uses a back propagation method to calculate a "parameter 307 of the deep net used by the extraction unit 203" that further reduces the difference value 306, and updates the currently set "parameter of the deep net used by the extraction unit 203" to the parameter 307. The extraction unit 203 thereby inputs the next input image to the deep net B reconstructed according to the parameter 307, and acquires the second feature vector 303 (512 dimensions) extracted from the image at the intermediate layer in the deep net B. The deep net B reconstructed according to the parameter 307 has changed in terms of the weight coefficient or the like in the deep net B before reconstruction.

An increasing unit 206 further increases an amount (increment amount) for increasing the value of the element Cj of the difference vector 304 corresponding to the element Aj having a value exceeding the threshold value TH1 among the elements of the first feature vector 302. In the aforementioned example, the weight value $\alpha$ is further increased, or the weight value $\beta$ is further reduced. Generally, the increasing unit 206 updates the setting to increase the increment amount of the value of the element from the difference vector 304 to the difference vector 305, in the function application region. Alternatively, the increasing unit 206 updates the setting to further reduce the amount of decrease of the value of the element from the difference vector 304 to the difference vector 305, in the function non-application region.

The increase of the weight value $\alpha$ by the increasing unit 206 is performed at a timing when the number of elements belonging to the function application region no longer decreases even when the number of learning times increases. In a case where an ReLU is used for the activation function of the deep net, all the outputs corresponding to input values of 0 or less are 0, and therefore when a learning rate is low at the time of parameter update by back propagation, the output remaining at 0, which tends to fall into a local solution. On the other hand, when the learning rate is increased, a variation of the parameter contributing to the element of the second feature vector 303 having a value that is not 0 is concurrently increased, and thus appropriate learning cannot be performed. Therefore, a value of the weight value $\alpha$ at the start of learning (initial value) is set to 1, and the parameter of the extraction unit 203 that outputs the element of the first feature vector 302 which is relatively easy to reproduce is acquired first.

The difference value corresponding to the function application region is increased by increasing the weight value $\alpha$ at the aforementioned timing. When the difference value is increased by the weight value $\alpha$, the learning promotes learning of a parameter contributing to the function application region. By sequentially increasing the weight value $\alpha$ in the aforementioned procedure allows for acquiring an ultimately appropriate parameter of the extraction unit 203.

Note that the timing of updating the setting to increase the increment amount by the increasing unit 206 is not limited to the aforementioned timing and may be determined, for example, depending on variation of increase and/or decrease of the difference value 306 (the same goes for the timing of updating the setting such that the decrease amount by the increasing unit 206 decreases). In other words, the timing of update may be when the amount of change, from the value at the previous time, of the difference value 306 calculated at this time is below a threshold value. In addition, updating may be performed regularly or irregularly depending on the number of repetitions of learning (the number of trials) or the elapsed time from the start of learning.

Learning of "the deep net used by the extraction unit 203" is performed by repeating the aforementioned processing (processing by the data acquisition unit 201, the extraction unit 202, the extraction unit 203, the acquisition unit 204a, the function application unit 204b, the calculation unit 204c, the updating unit 205 and the increasing unit 206).

A determination unit S207 determines whether or not a termination condition of learning is satisfied. The termination condition of learning is not limited to a specific condition. For example, the determination unit 207 determines that the termination condition of learning is satisfied when the user has operated the input unit 109 to input an instruction to terminate learning. Additionally, for example, the determination unit 207 determines that the termination condition of learning is satisfied when the number of repetitions of learning has exceeded a predetermined number of times or when the elapsed time from the start of learning has exceeded a predetermined time.

Next, the aforementioned operation of the information processing apparatus 100 will be described according to the flowchart illustrated in FIG. 3. Details of processing at each step has already been described above, and therefore only a brief description will be provided below.

At step S401, the data acquisition unit 201 loads (acquires) the image 301 stored in the external storage apparatus 104 to the RAM 103. At step S402, the extraction unit 202 inputs the image 301 acquired at step S401 to the deep net A, and acquires the first feature vector 302 extracted from the image 301 at the intermediate layer in the deep net A.

At step S403, the extraction unit 203 inputs the image 301 acquired at step S401 to the deep net B, and acquires the second feature vector 303 extracted from the image 301 at the intermediate layer in the deep net B.

At step S404, the acquisition unit 204a generates the difference vector 304 between the first feature vector 302 acquired at step S402 and the second feature vector 303 acquired at step S403.

At step S405, the function application unit 204b identifies the element Aj having a value exceeding the threshold value TH1 among the elements of the first feature vector 302, and generates the difference vector 305 by increasing the value of the element Cj of the difference vector 304 corresponding to the element Aj.

At step S406, the calculation unit 204c calculates, as the difference value 306, a value calculated by dividing by 1024 a total value of the values of all the elements of the difference vector 305 generated at step S405.

At step S407, the updating unit 205 calculate, by using a back propagation method, the "parameter 307 of the deep net used by the extraction unit 203" that further reduces the difference value 306 calculated at step S406. The updating unit 205 then updates the currently set "parameter of the deep net used by the extraction unit 203" to the parameter 307.

At step S408, the increasing unit 206 determines whether or not it is the timing of updating the weight value α. As a result of the determination, the processing proceeds to step S409 when it is the timing of updating the weight value α, and when it is not the timing of updating the weight value α, the processing proceeds to step S410.

For example, when a condition that the number of elements belonging to the function application region does not continuously change through 100 times of learning is satisfied, it is determined that it is the timing of updating the weight value α, and when the condition is not satisfied, it is determined that it is not the timing of updating the weight value α.

At step S409, the increasing unit 206 further increases the weight value α. Here, it is assumed that the initial value of the weight value α is 1, and the increment of the weight value α increased by one increment is 64. At step S410, the determination unit 207 determines whether or not the termination condition of learning is satisfied. As the result of the determination, the processing according to the flowchart illustrated in FIG. 3 is terminated when the termination condition of learning is satisfied, and when the termination condition of learning is not satisfied, the processing proceeds to step S401.

Figure 3:
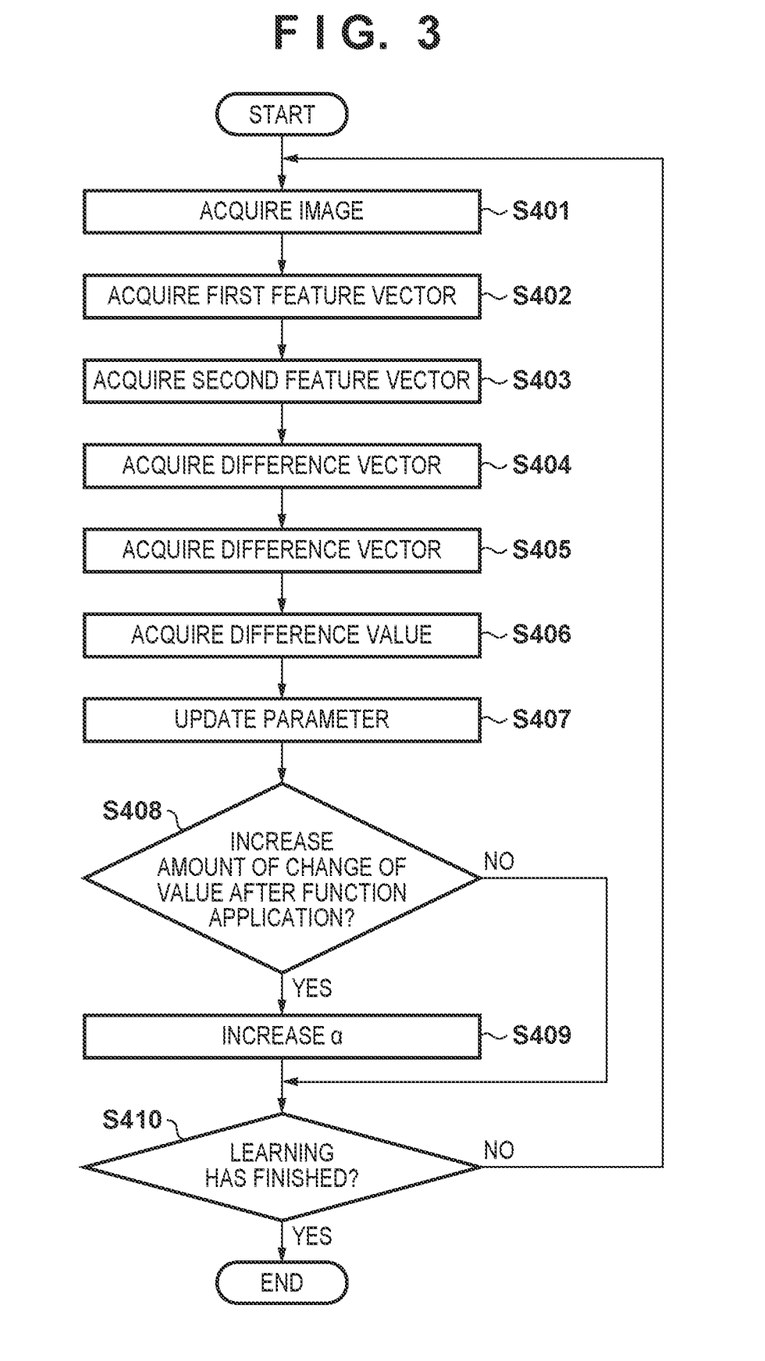
FIG. 3 is a flowchart illustrating an operation of the information processing apparatus 100.

Note that the CPU 101 may store, in the external storage apparatus 104, the "parameter 307 of the deep net used by the extraction unit 203" acquired by the learning processing according to the flowchart illustrated in FIG. 3, or may transmit to an external apparatus via the network. In addition, the CPU 101 may display the "parameter 307 of the deep net used by the extraction unit 203" on the monitor 110 by using images, characters, or the like. As such, the output destination and the form of output of the "parameter 307 of the deep net used by the extraction unit 203" are not limited to any specific output destination and form of output.

As such, the present embodiment provides a weight value to the difference of function application regions at the time of distillation, and increases the weight value in accordance with the progress of learning. The foregoing approach allows for making the feature vector of the student model and the feature vector of the teacher model substantially identical even for distillation with a high degree of difficulty, which has been difficult to realize by conventional methods.

Second Embodiment

In the following, differences from the first embodiment will be described, and it is assumed that the second embodiment is similar to the first embodiment unless otherwise specified. An exemplary functional configuration of the extraction units 202 and 203 according to the present embodiment will be described, referring to the block diagram illustrated in FIG. 4.

Figure 4:
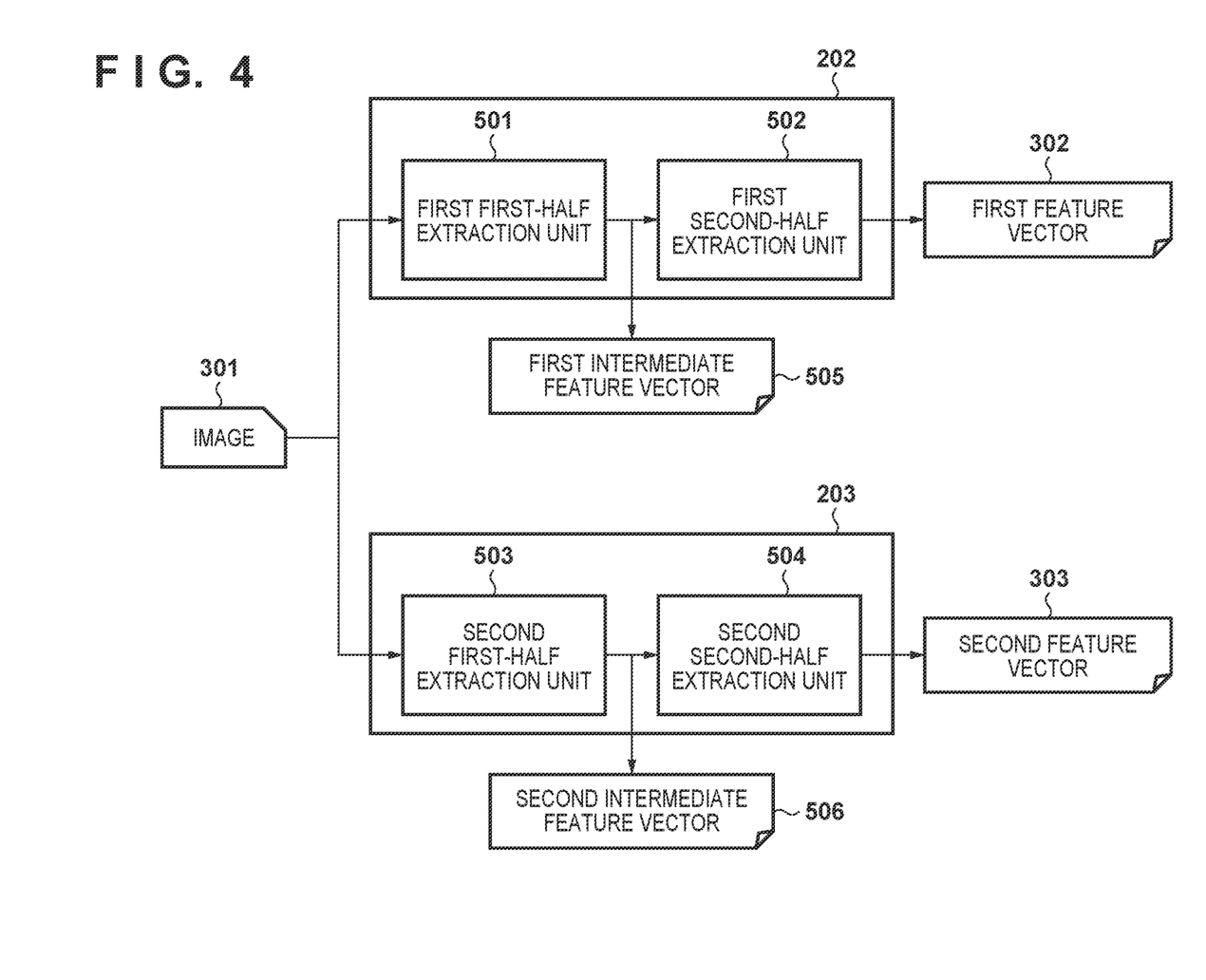
FIG. 4 is a block diagram illustrating exemplary functional configurations of an extraction units 202 and 203.

The extraction unit 202 according to the present embodiment includes a first first-half extraction unit 501 and a first second-half extraction unit 502. The first first-half extraction unit 501 inputs the input image 301 to the deep net A, and acquires a first intermediate feature vector 505 extracted from the image 301 at the intermediate layer A in the deep net A. The intermediate layer A is an intermediate layer between the input layer and an "intermediate layer that outputs the first feature vector 302" in the deep net A. The first second-half extraction unit 502 generates the first feature vector 302 by performing calculation at each layer subsequent to the intermediate layer A, with the first intermediate feature vector 505 as an input.

The extraction unit 203 according to the present embodiment includes a second first-half extraction unit 503 and a second second-half extraction unit 504. The second first-half extraction unit 503 inputs the input image 301 to the deep net B and acquires a second intermediate feature vector 506 extracted from the image 301 at the intermediate layer B in the deep net B. The intermediate layer B is an intermediate layer between the input layer and an "intermediate layer that outputs the second feature vector 303" in the deep net B. The second second-half extraction unit 504 generates the second feature vector 303 by performing calculation at each layer subsequent to the intermediate layer B, with the second intermediate feature vector 506 as an input.

Since the first feature vector 302 is acquired from a learned deep net, the first feature vector 302 has values close to the correct label. Therefore, when almost all the values of the elements of the vector of the correct label are 0, many of the values of the elements of the first feature vector 302 are similarly 0, and when the threshold value TH1 is set to 0 as in the present embodiment, there may be almost no element belonging to the function application region.

On the other hand, the first intermediate feature vector 505 is a vector having acquired various features from the image 301 to acquire the first feature vector 302 to have values close to the correct label, whereby many of the values of the elements of the first intermediate feature vector 505 is non-zero. Accordingly, the first intermediate feature vector 505 includes many elements belonging to the function application region, and by performing distillation using the intermediate feature vector, the aforementioned learning can be executed more effectively.

Figure 5A:
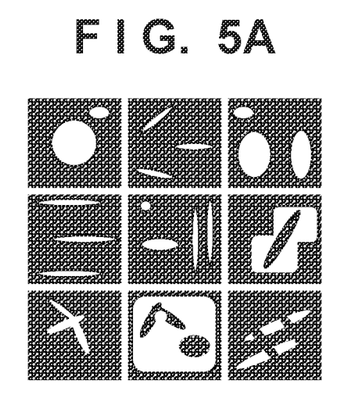
FIG. 5A is a diagram illustrating an example of an intermediate feature vector and a difference vector.
Figure 5B:
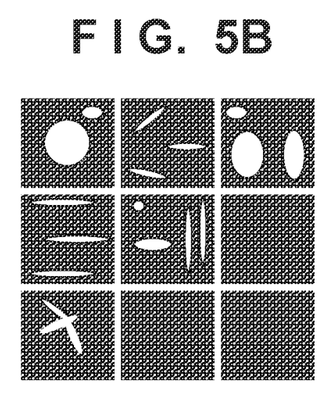
FIG. 5B is a diagram illustrating an example of an intermediate feature vector and a difference vector.
Figure 5C:
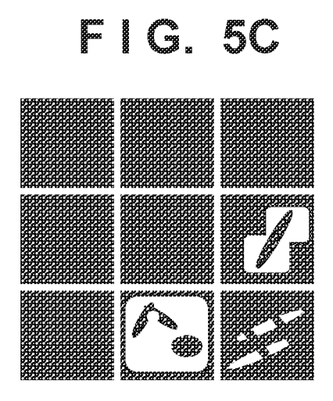
FIG. 5C is a diagram illustrating an example of an intermediate feature vector and a difference vector.

The intermediate feature vector and the difference vector will be described, referring to FIGS. 5A to 5C. FIGS. 5A to 5C illustrate examples of three-dimensional intermediate feature vectors including nine sets of two-dimensional data. Regions painted out with black is indicated to have a value of 0, and regions painted out with white is indicated to have a non-zero value.

FIG. 5A illustrates an example of the first intermediate feature vector 505, in which the intermediate feature vector from the learned deep net (extraction unit 202) have acquired various features of the image 301 and thus the first intermediate feature vector 505 includes many non-zero regions.

FIG. 5B illustrates an example of the second intermediate feature vector 506 from the deep net (extraction unit 203) at midway of learning, in which three sets of two-dimensional data have a value of 0, and other sets of two-dimensional data have a value equivalent to that of the first intermediate feature vector 505.

FIG. 5C illustrates an example of a difference vector between the first intermediate feature vector 505 and the second intermediate feature vector 506, in which a difference occurs in three sets of two-dimensional data. Since all the regions where a difference is occurred are function application regions, the learning of the parameters contributing to the three sets of two-dimensional data can be promoted by increasing the value of the weight value α.

Figure 6:
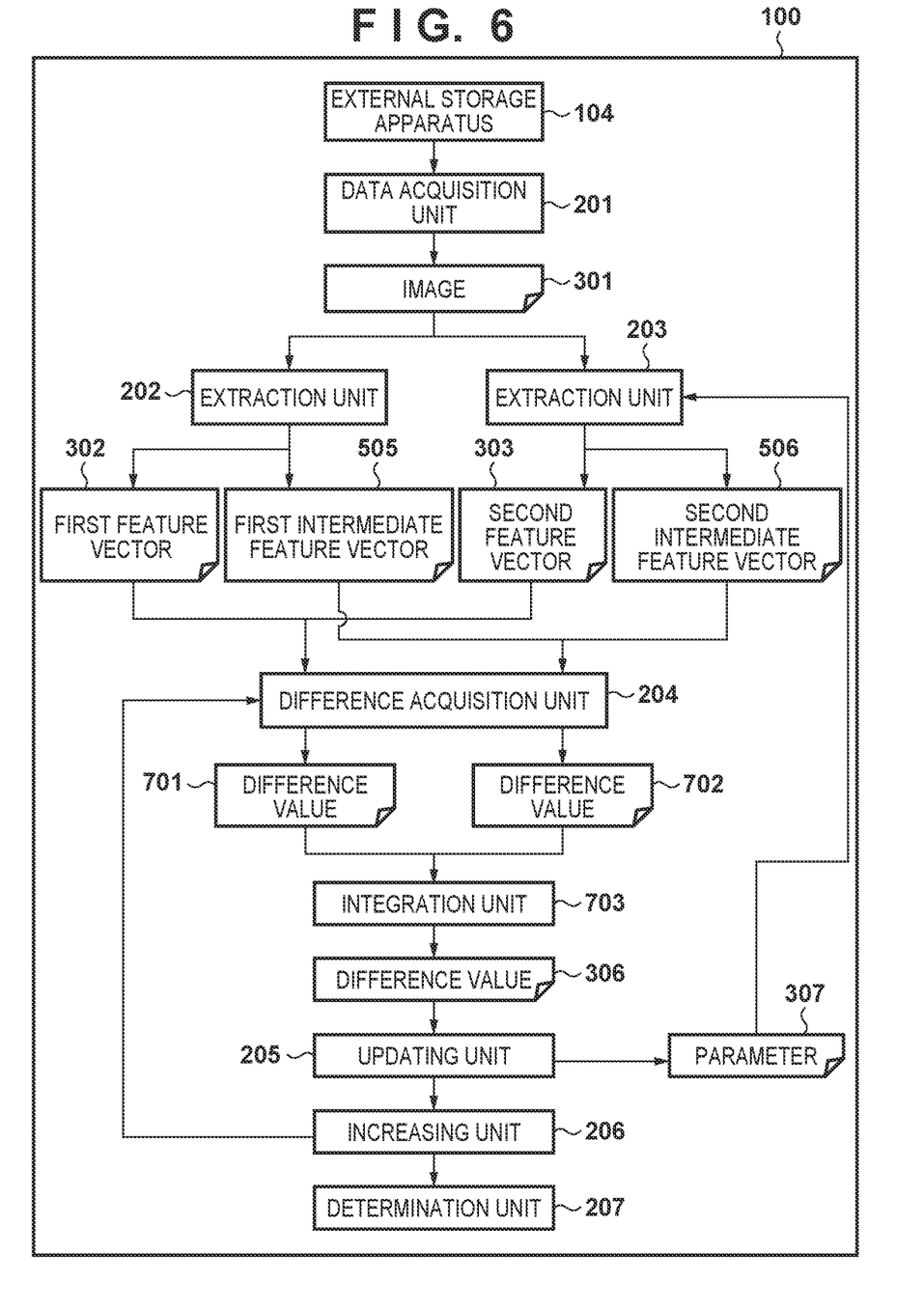
FIG. 6 is a block diagram illustrating an exemplary functional configuration of the information processing apparatus 100.

An exemplary functional configuration of the information processing apparatus 100 according to the present embodiment will be described, referring to the block diagram illustrated in FIG. 6. The extraction unit 202 acquires the first feature vector 302 and the first intermediate feature vector 505 from the image 301. The extraction unit 203 acquires the second feature vector 303 and the second intermediate feature vector 506 from the image 301.

The difference acquisition unit 204 acquires a difference value 701 from the first feature vector 302 and the second feature vector 303 in a manner similar to the first embodiment, and acquires a difference value 702 from the first intermediate feature vector 505 and the second intermediate feature vector 506 in a manner similar to the first embodiment. There are various processing for acquiring a difference value from two vectors as described in the first embodiment. Therefore, the processing for acquiring the difference value 701 and the processing for acquiring the difference value 702 may be a same processing or different processing, and when the two processing are same, the threshold values or the weight values α may be changed between the two processing.

An integration unit 703 calculates a total value of the difference value 701 and the difference value 702 as the difference value 306. Subsequently, a processing similar to the first embodiment is performed to calculate the parameter 307, and then the parameter of the extraction unit 203 is updated by the parameter 307 thus calculated.

In addition, the update timing of the threshold value and the weight value α used to calculate the difference value 701 and the update timing of the threshold value and the weight value α used to calculate the difference value 702 may be identical or different. In addition, the increment amount of the weight value α used to calculate the difference value 701 and the increment amount of the weight value α used to calculate the difference value 702 may be identical or different.

In the present embodiment, the extraction unit 202 acquires the first feature vector 302 and the first intermediate feature vector 505 from the image 301 at step S402 in the flowchart illustrated in FIG. 3. The extraction unit 203 then acquires, at step S403, the second feature vector 303 and the second intermediate feature vector 506 from the image 301.

The difference acquisition unit 204 then acquires the difference value 701 from the first feature vector 302 and the second feature vector 303 in a manner similar to the first embodiment in the processing from step S404 to step S406. In addition, the difference acquisition unit 204 acquires the difference value 702 from the first intermediate feature vector 505 and the second intermediate feature vector 506 similarly to the processing from step S404 to step S406. The integration unit 703 then calculates, at step S406, a total value of the difference value 701 and the difference value 702 as the difference value 306. The processing in other steps is similar to the first embodiment.

As such, the present embodiment allows for making the feature vector of the student model and the feature vector of the teacher model substantially identical with a higher precision in a case of distillation using an intermediate feature vector, even for distillation with a high degree of difficulty, which has been difficult to realize by conventional methods.

Alternatively, the numerical values, processing timings, processing orders, processing entities, and data (information) transmission destinations/transmission sources/storage locations, and the like used in the embodiments described above are referred to for specific description as an example, and are not intended for limitation to these examples.

Alternatively, some or all of the embodiments described above may be used in combination as appropriate. Alternatively, some or all of the embodiments described above may be selectively used.

Other Embodiments

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2022-020797, filed Feb. 14, 2022, which is hereby incorporated by reference herein in its entirety.

What is claimed is:

1. An information processing apparatus comprising:
   at least one processor; and
   at least one memory storing instructions, which when executed by the processor, cause the information processing apparatus to:
   calculate a first difference vector between a first feature vector extracted by a first calculation unit based on input data, and a second feature vector extracted by a second calculation unit based on the input data with a smaller amount of calculation than the first calculation unit;
   generate a first changed difference vector by changing a value of an element in the first difference vector, and update a parameter of the second calculation unit based on the first changed difference vector; and
   increase an increment amount by which a value of the element of the first difference vector corresponding to the first element is increased,
   wherein an amount of change from a value of an element of the first difference vector corresponding to a first element exceeding a threshold value in the first feature vector to a value of an element of the first changed difference vector corresponding to the first element is larger than an amount of change from a value of an element of the first difference vector corresponding to a second element not exceeding the threshold value in the first feature vector to a value of an element of the first changed difference vector corresponding to the second element, and
   wherein the increment amount by which the value of the element of the first difference vector corresponding to the first element is increased, at a timing when the number of the elements of the first difference vector corresponding to the first element no longer decreases.

2. The information processing apparatus according to claim 1, wherein the instructions, when executed by the processor, further cause the information processing apparatus to: generate the first changed difference vector by increasing a value of an element of the first difference vector corresponding to a first element exceeding a threshold value in the first feature vector.

3. The information processing apparatus according to claim 1, wherein the instructions, when executed by the processor, further cause the information processing apparatus to: generate the first changed difference vector by reducing a value of an element of the first difference vector corresponding to a second element not exceeding a threshold value in the first feature vector.

4. The information processing apparatus according to claim 1, wherein the instructions, when executed by the processor, further cause the information processing apparatus to: calculate a parameter of the second calculation unit that further reduces a value based on the value of the element in the first changed difference vector, and updates the parameter of the second calculation unit to the parameter thus calculated.

5. The information processing apparatus according to claim 1, wherein the first calculation unit inputs input data to a hierarchical neural network and acquires a feature vector extracted at an intermediate layer of the hierarchical neural network from the input data as the first feature vector.

6. The information processing apparatus according to claim 5, wherein an activation function of the hierarchical neural network used by the first calculation unit is a Rectified Linear Unit (ReLU).

7. The information processing apparatus according to claim 1, wherein the second calculation unit inputs input data to a hierarchical neural network with a smaller number of parameters than the hierarchical neural network used by the first calculation unit, and acquires a feature vector extracted at an intermediate layer of the hierarchical neural network from the input data as the second feature vector.

8. The information processing apparatus according to claim 7, wherein an activation function of the hierarchical neural network used by the second calculation unit is a Rectified Linear Unit (ReLU).

9. The information processing apparatus according to claim 1, wherein the instructions, when executed by the processor, further cause the information processing apparatus to:
   acquire a second difference vector between a first intermediate feature vector extracted by the first calculation unit based on input data, and a second intermediate feature vector extracted by the second calculation unit, based on the input data, with a smaller amount of calculation than the first calculation unit; and
   generate a second changed difference vector by changing a value of an element in the second difference vector, and updates the parameter of the second calculation unit based on the second changed difference vector and the first changed difference vector,
   wherein an amount of change from a value of an element of the second difference vector corresponding to a third element exceeding a threshold value in the first intermediate feature vector to a value of an element of the second changed difference vector corresponding to the third element is larger than an amount of change from a value of an element of the second difference vector corresponding to a fourth element not exceeding the threshold value in the first intermediate feature vector to a value of an element of the second changed difference vector corresponding to the fourth element.

10. The information processing apparatus according to claim 9, wherein the instructions, when executed by the processor, further cause the information processing apparatus to: calculate a parameter of the second calculation unit that further reduces a value based on the value of the element in the first changed difference vector and a value based on the value of the element in the second changed difference vector, and updates the parameter of the second calculation unit to the parameter thus calculated.

11. An information processing method performed by an information processing apparatus, comprising:
- calculating a first difference vector between a first feature vector extracted by a first calculation unit based on input data, and a second feature vector extracted by a second calculation unit based on the input data with a smaller amount of calculation than the first calculation unit;
- generating a first changed difference vector by changing a value of an element in the first difference vector, and updating a parameter of the second calculation unit based on the first changed difference vector; and
- increasing an increment amount by which a value of the element of the first difference vector corresponding to the first element is increased,
- wherein an amount of change from a value of an element of the first difference vector corresponding to a first element exceeding a threshold value in the first feature vector to a value of an element of the first changed difference vector corresponding to the first element is larger than an amount of change from a value of an element of the first difference vector corresponding to a second element not exceeding the threshold value in the first feature vector to a value of an element of the first changed difference vector corresponding to the second element, and
- wherein the increment amount by which the value of the element of the first difference vector corresponding to the first element is increased, at a timing when the number of the elements of the first difference vector corresponding to the first element no longer decreases.

12. A non-transitory computer-readable storage medium storing a computer program for causing a computer to execute, as an information processing apparatus, the computer program, which when executed by the computer causes the information processing apparatus to:
- calculate a first difference vector between a first feature vector extracted by a first calculation unit based on input data, and a second feature vector extracted by a second calculation unit based on the input data with a smaller amount of calculation than the first calculation unit;
- generate a first changed difference vector by changing a value of an element in the first difference vector, and update a parameter of the second calculation unit based on the first changed difference vector; and
- increase an increment amount by which a value of the element of the first difference vector corresponding to the first element is increased,
- wherein an amount of change from a value of an element of the first difference vector corresponding to a first element exceeding a threshold value in the first feature vector to a value of an element of the first changed difference vector corresponding to the first element is larger than an amount of change from a value of an element of the first difference vector corresponding to a second element not exceeding the threshold value in the first feature vector to a value of an element of the first changed difference vector corresponding to the second element, and
- wherein the increment amount by which the value of the element of the first difference vector corresponding to the first element is increased, at a timing when the number of the elements of the first difference vector corresponding to the first element no longer decreases.

* * * * *